(12) United States Patent
Mola

(10) Patent No.: US 11,907,091 B2
(45) Date of Patent: Feb. 20, 2024

(54) TRACE RECORDING BY LOGGING INFLUXES TO AN UPPER-LAYER SHARED CACHE, PLUS CACHE COHERENCE PROTOCOL TRANSITIONS AMONG LOWER-LAYER CACHES

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 818 days.

(21) Appl. No.: 15/898,372

(22) Filed: Feb. 16, 2018

(65) Prior Publication Data
US 2019/0258556 A1   Aug. 22, 2019

(51) Int. Cl.
*G06F 11/30*  (2006.01)
*G06F 11/34*  (2006.01)
(Continued)

(52) U.S. Cl.
CPC ...... *G06F 11/3037* (2013.01); *G06F 11/3466* (2013.01); *G06F 11/3476* (2013.01);
(Continued)

(58) Field of Classification Search
None
See application file for complete search history.

(56) References Cited

U.S. PATENT DOCUMENTS 4,598,364 A   7/1986   Gum et al.
5,381,533 A   1/1995   Peleg et al.
(Continued)

FOREIGN PATENT DOCUMENTS

CN   1732433 A      2/2006
CN   101103337 A    1/2008
(Continued)

OTHER PUBLICATIONS

ECMon: exposing cache events for monitoring. / Nagarajan, Vijay; Gupta, Rajiv. ISCA '09 Proceedings of the 36th annual international symposium on Computer architecture. ACM, 2009. p. 349-360. (Year: 2009).*
(Continued)

*Primary Examiner* — Rocio Del Mar Perez-Velez
*Assistant Examiner* — Marwan Ayash
(74) *Attorney, Agent, or Firm* — Workman Nydegger

(57) ABSTRACT

Trace recording based on data influxes to an outer-level cache and cache coherence protocol (CCP) transitions between inner caches. Example computing device(s) include a plurality of processing units, a plurality of (N-1)-level caches, and an N-level cache that is associated with two or more of the (N-1)-level caches and that is a backing store for the two or more (N-1)-level caches. Based at least on detecting influx(es) of data to a location in the N-level cache during execution across the processing units, the computing device(s) causes the influx(es) of data to be logged. The computing device(s) also causes one or more (N-1)-level CCP transitions between the two or more (N-1)-level caches to be logged. The (N-1)-level CCP transitions result from the location being accessed by two or more of the processing units.

20 Claims, 7 Drawing Sheets

(51) Int. Cl.
  *G06F 12/0811* (2016.01)
  *G06F 12/0815* (2016.01)
  *G06F 11/36* (2006.01)
(52) U.S. Cl.
  CPC ...... *G06F 11/3636* (2013.01); *G06F 12/0811* (2013.01); *G06F 12/0815* (2013.01)

(56) References Cited

U.S. PATENT DOCUMENTS

| | | | |
|---|---|---|---|
| 5,894,575 A | 4/1999 | Levine et al. | |
| 5,905,855 A | 5/1999 | Klaiber et al. | |
| 5,944,841 A | 8/1999 | Christie | |
| 6,009,270 A | 12/1999 | Mann | |
| 6,076,156 A | 6/2000 | Pickett et al. | |
| 6,094,729 A | 7/2000 | Mann | |
| 6,101,524 A | 8/2000 | Choi et al. | |
| 6,167,536 A | 12/2000 | Mann | |
| 6,351,844 B1 | 2/2002 | Bala | |
| 6,634,011 B1 | 10/2003 | Peltier et al. | |
| 6,728,949 B1 | 4/2004 | Bryant et al. | |
| 6,854,108 B1 | 2/2005 | Choi | |
| 7,055,070 B1 | 5/2006 | Uhler et al. | |
| 7,089,400 B1 | 8/2006 | Pickett et al. | |
| 7,178,133 B1 | 2/2007 | Thekkath | |
| 7,181,728 B1 | 2/2007 | Thekkath | |
| 7,448,025 B2 | 11/2008 | Kalafatis et al. | |
| 7,506,318 B1 | 3/2009 | Lindo et al. | |
| 7,620,938 B2 | 11/2009 | Edwards et al. | |
| 7,676,632 B2 | 3/2010 | Miller | |
| 7,877,630 B1 | 1/2011 | Favor et al. | |
| 7,958,497 B1 | 6/2011 | Lindo et al. | |
| 8,010,337 B2 | 8/2011 | Narayanan et al. | |
| 8,423,965 B2 | 4/2013 | Goel et al. | |
| 8,468,501 B2 | 6/2013 | Subhraveti | |
| 8,484,516 B2 | 7/2013 | Giannini et al. | |
| 8,499,200 B2 | 7/2013 | Cathro | |
| 8,612,650 B1 | 12/2013 | Carrie et al. | |
| 8,719,796 B2 | 5/2014 | Rosu et al. | |
| 9,015,441 B2 | 4/2015 | Worthington et al. | |
| 9,058,415 B1 | 6/2015 | Serebrin et al. | |
| 9,268,666 B2 | 2/2016 | Law et al. | |
| 9,300,320 B2 | 3/2016 | Ansari et al. | |
| 9,361,228 B2 | 6/2016 | Turner et al. | |
| 9,465,680 B1 | 10/2016 | Chynoweth et al. | |
| 9,535,815 B2 | 1/2017 | Smith et al. | |
| 9,569,338 B1 | 2/2017 | Bradbury et al. | |
| 9,767,237 B2 | 9/2017 | Suresh et al. | |
| 10,031,833 B2 | 7/2018 | Mola | |
| 10,031,834 B2 | 7/2018 | Mola | |
| 11,138,092 B2 | 10/2021 | Mola | |
| 2001/0034854 A1 | 10/2001 | Mukherjee | |
| 2002/0124237 A1 | 9/2002 | Sprunt et al. | |
| 2002/0144101 A1 | 10/2002 | Wang et al. | |
| 2003/0079205 A1 | 4/2003 | Miyao et al. | |
| 2003/0126508 A1 | 7/2003 | Litt | |
| 2004/0117690 A1 | 6/2004 | Andersson | |
| 2004/0139305 A1* | 7/2004 | Arimilli | G06F 9/30072 712/227 |
| 2004/0148472 A1 | 7/2004 | Barroso et al. | |
| 2004/0153635 A1 | 8/2004 | Kaushik et al. | |
| 2005/0155019 A1 | 7/2005 | Levine et al. | |
| 2005/0223364 A1 | 10/2005 | Peri et al. | |
| 2006/0112310 A1 | 5/2006 | Mchale et al. | |
| 2006/0230390 A1 | 10/2006 | Alexander et al. | |
| 2006/0259823 A1 | 11/2006 | Sohm et al. | |
| 2007/0106827 A1 | 5/2007 | Boatright et al. | |
| 2007/0130237 A1 | 6/2007 | Altman et al. | |
| 2007/0150881 A1 | 6/2007 | Khawand et al. | |
| 2007/0168989 A1 | 7/2007 | Edwards et al. | |
| 2007/0214342 A1 | 9/2007 | Newburn et al. | |
| 2007/0220361 A1 | 9/2007 | Barnum et al. | |
| 2008/0065810 A1 | 3/2008 | Spanel et al. | |
| 2008/0091867 A1 | 4/2008 | Plondke et al. | |
| 2008/0114964 A1 | 5/2008 | Davis et al. | |
| 2008/0115113 A1 | 5/2008 | Codrescu et al. | |
| 2008/0215920 A1 | 9/2008 | Mayer et al. | |
| 2008/0250207 A1 | 10/2008 | Davis et al. | |
| 2008/0256339 A1 | 10/2008 | Xu et al. | |
| 2008/0256396 A1 | 10/2008 | Giannini et al. | |
| 2008/0288826 A1 | 11/2008 | Nemoto | |
| 2009/0037886 A1 | 2/2009 | Mccoy et al. | |
| 2009/0144742 A1 | 6/2009 | Subhraveti et al. | |
| 2009/0157359 A1 | 6/2009 | Chernoff | |
| 2010/0205484 A1 | 8/2010 | Dragicevic et al. | |
| 2010/0250856 A1 | 9/2010 | Owen et al. | |
| 2010/0251031 A1 | 9/2010 | Nieh et al. | |
| 2010/0268995 A1 | 10/2010 | Goodman et al. | |
| 2011/0145530 A1 | 6/2011 | Taillefer et al. | |
| 2011/0271070 A1 | 11/2011 | Worthington et al. | |
| 2011/0276761 A1 | 11/2011 | Saha et al. | |
| 2011/0288847 A1 | 11/2011 | Narayanan et al. | |
| 2012/0011491 A1 | 1/2012 | Eldar et al. | |
| 2012/0095728 A1 | 4/2012 | Ubukata | |
| 2012/0179872 A1 | 7/2012 | Strumpen | |
| 2013/0036403 A1 | 2/2013 | Geist | |
| 2013/0086567 A1 | 4/2013 | Inoue et al. | |
| 2014/0047196 A1 | 2/2014 | Frey et al. | |
| 2014/0059523 A1 | 2/2014 | Frazier et al. | |
| 2014/0189256 A1 | 7/2014 | Kranich et al. | |
| 2014/0281710 A1 | 9/2014 | Cain et al. | |
| 2014/0372987 A1 | 12/2014 | Strong et al. | |
| 2015/0089155 A1 | 3/2015 | Busaba et al. | |
| 2015/0089301 A1 | 3/2015 | Laurenti | |
| 2015/0212940 A1 | 7/2015 | Fowles et al. | |
| 2015/0331804 A1 | 11/2015 | Vajapeyam | |
| 2015/0355996 A1 | 12/2015 | Smith et al. | |
| 2015/0378870 A1 | 12/2015 | Marron et al. | |
| 2016/0292061 A1 | 10/2016 | Marron et al. | |
| 2017/0052876 A1 | 2/2017 | Svensson et al. | |
| 2017/0091091 A1 | 3/2017 | Bradbury et al. | |
| 2017/0140082 A1 | 5/2017 | Suresh et al. | |
| 2017/0161173 A1 | 6/2017 | Bradbury et al. | |
| 2017/0213028 A1* | 7/2017 | Chen | G06F 21/53 |
| 2017/0286260 A1* | 10/2017 | Baartmans | G06F 9/466 |
| 2017/0351517 A1* | 12/2017 | Diestelhorst | G06F 9/30043 |
| 2017/0371769 A1 | 12/2017 | Merten et al. | |
| 2018/0060214 A1 | 3/2018 | Mola | |
| 2018/0060215 A1 | 3/2018 | Mola | |
| 2018/0253369 A1 | 9/2018 | O'dowd et al. | |
| 2018/0314623 A1 | 11/2018 | Mola | |
| 2019/0065339 A1 | 2/2019 | Mola | |
| 2020/0349051 A1 | 11/2020 | Mola | |
| 2022/0012162 A1 | 1/2022 | Mola | |

FOREIGN PATENT DOCUMENTS

| | | |
|---|---|---|
| CN | 101874238 A | 10/2010 |
| CN | 102844744 A | 12/2012 |
| CN | 103885894 A | 6/2014 |
| CN | 105408877 A | 3/2016 |
| CN | 109643273 A | 4/2019 |
| EP | 3507698 A1 | 7/2019 |
| JP | H11161545 A | 6/1999 |
| JP | 2000148533 A | 5/2000 |
| JP | 2002304328 A | 10/2002 |
| JP | 2007207223 A | 8/2007 |
| KR | 20110134855 A | 12/2011 |
| RU | 2599537 C2 | 10/2016 |
| WO | 2013147898 A1 | 10/2013 |
| WO | 2017028908 A1 | 2/2017 |

OTHER PUBLICATIONS

T. C. Mowry and S. R. Ramkissoon, "Software-controlled multi-threading using informing memory operations," Proceedings Sixth International Symposium on High-Performance Computer Architecture. HPCA-6 (Cat. No.PR00550), Toulouse, France, 2000, pp. 121-132, doi: 10.1109/HPCA.2000.824344. (Year: 2000).*
1. 2009—Offline Symbolic Analysis for Multi-Processor Execution Replay, by Lee et al. (Year: 2009).*
"International Search Report and Written Opinion Issued in PCT Application No. PCT/US19/015056", dated Aug. 5, 2019, 13 Pages.

(56) References Cited

OTHER PUBLICATIONS

"Notice of Allowance Issued in U.S. Appl. No. 15/915,930", dated Jun. 6, 2019, 8 Pages.

"7 Recording Inferior's Execution and Replaying It", Retrieved From: https://web.archive.org/web/20161009233228/https://sourceware.org/gdb/onlinedocs/gdb/Process-Record-and-Replay.html, Retrieved on: May 27, 2016, 6 Pages.

"Non-final Office Action Issued in U.S. Appl. No. 15/349,555", dated Oct. 6, 2017, 22 Pages.

"Elm's Time Traveling Debugger", Retrieved From: https://web.archive.org/web/20160522023348/http://debug.elm-lang.org/, Retrieved on: May 22, 2016, 4 Pages.

"IntelliTrace", Retrieved From: https://web.archive.org/web/20160521122918/https://msdn.microsoft.com/en-us/library/dd264915.aspx, Retrieved Date: May 21, 2016, 5 Pages.

"rr: Lightweight Recording & Deterministic Debugging", Retrieved From: https://web.archive.org/web/20160521063109/https://rr-project.org/, Retrieved on: May 21, 2016, 4 Pages.

"Non-Final Office Action Issued in U.S. Appl. No. 15/252,998", dated Sep. 20, 2017, 15 Pages.

"Non-final Office Action Issued in U.S. Appl. No. 15/253,027", dated Oct. 10, 2017, 25 Pages.

"Notice of Allowance Issued in U.S. Appl. No. 15/253,027", dated Mar. 21, 2018, 13 Pages.

"Notice of Allowance Issued in U.S. Appl. No. 15/349,555", dated Mar. 29, 2018, 21 Pages.

Barr, et al., "TARDIS: Affordable Time-Travel Debugging in Managed Runtimes", In Proceedings of the International Conference on Object Oriented Programming Systems Languages & Applications, Oct. 20, 2014, 16 Pages.

Bhansali, et al., "Framework for Instruction-level Tracing and Analysis of Program Executions", In Proceedings of the 2nd International Conference on Virtual Execution Environments, Jun. 14, 2006, pp. 154-163.

Brady, Fiorenza, "Cambridge University Study States Software Bugs Cost Economy $312 Billion Per Year", Retrieved From: http://www.prweb.eom/releases/2013/1/prweb10298185.htm, Jan. 8, 2013, 4 Pages.

Charles, "Arun Kishan: Inside Windows 7—Farewell to the Windows Kernel Dispatcher Lock", Retrieved From https://channel9.msdn.com/shows/Going+Deep/Arun-Kishan-Farewell-to-the-Windows-kernel-Dispatcher-Lock/, Aug. 6, 2009, 9 Pages.

Dimitrov, et al., "Time-Ordered Event Traces: A New Debugging Primitive for Concurrency Bugs", In Proceedings of IEEE International Parallel & Distributed Processing Symposium (IPDPS), May 16, 2011, pp. 311-321.

Guo, et al., "R2: An Application-Level Kernel for Record and Replay", In Proceedings of the 8th USENIX Symposium on Operating Systems Design and Implementation, Dec. 8, 2008, pp. 193-208.

Hower, et al., "Two Hardware-Based Approaches For Deterministic Multiprocessor Replay", Published in Communications of the ACM, vol. 52, Issue 6, Jun. 1, 2009, pp. 93-100.

Jiang, et al., "CARE: Cache Guided Deterministic Replay for Concurrent Java Programs", In Proceedings of the 36th International Conference on Software Engineering, May 31, 2014, 11 Pages.

King, et al., "Debugging Operating Systems With Time-Traveling Virtual Machines", In Proceedings of Annual USENIX Technical Conference, Apr. 10, 2005, pp. 1-15.

Kleen, Andi, "Adding Processor Trace Support to Linux", Retrieved From: https://lwn.net/Articles/648154/, Jul. 1, 2015, 7 Pages.

Lai, et al., "A Versatile Data Cache for Trace Buffer Support", In Journal of IEEE Transactions on Circuits and Systems, vol. 61, Issue 11, Nov. 2014, pp. 3145-3154.

Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.

Liang, et al., "Improved Procedure Placement for Set Associative Caches", In Proceedings of the International Conference on Compilers, Architectures and Synthesis for Embedded Systems, Oct. 24, 2010, pp. 147-156.

Liang, et al., "Instruction Cache Locking Using Temporal Reuse Profile", In Proceedings of the 47th Design Automation Conference, Jun. 13, 2010, pp. 344-349.

Mercer, et al., "Model Checking Machine Code with the GNU Debugger", In Proceedings of the 12th International Conference on Model Checking Software, Aug. 22, 2005, 15 Pages.

Xu, et al., "ReTrace: Collecting Execution Trace with Virtual Machine Deterministic Replay", In Proceedings of the Third Annual Workshop on Modeling, Benchmarking and Simulation, Jan. 1, 2007, 8 Pages.

Narayanasamy, et al., "BugNet: Continuously Recording Program Execution for Deterministic Replay Debugging", In Proceedings of the 32nd Annual International Symposium on Computer Architecture, Jun. 4, 2005, 12 Pages.

"International Search Report and Written Opinion Issued in PCT Application No. PCT/US2017/048094", dated Nov. 10, 2017, 12 Pages.

"International Search Report and Written Opinion Issued in PCT Application No. PCT/US2017/060075", dated Feb. 28, 2018, 11 Pages.

Rivers, et al., "Utilizing Reuse Information in Data Cache Management", In Proceedings of the 12th International Conference on Supercomputing, Jul. 13, 1998, pp. 449-456.

Sahuquillo, et al., "The Filter Cache: A Run-Time Cache Management Approach", In Proceedings of 25th EUROMICRO Conference, Sep. 8, 1999, 8 Pages.

Shaaban, et al., "Improving Trace Cache Hit Rates Using the Sliding Window Fill Mechanism and Fill Select Table", In Proceedings of the Workshop on Memory System Performance, Jun. 8, 2004, pp. 36-41.

Sharma, Suchakrapani Datt., "Hardware Tracing with Intel Processor Trace", Retrieved From: http://hsdm.dorsal.polymtl.ca/system/files/10Dec2015_0.pdf, Dec. 10, 2015, 30 Pages.

Tchagou, et al., "Reducing Trace Size in Multimedia Applications Endurance Tests", In Proceedings of Design, Automation & Test in Europe Conference & Exhibition (DATE), Mar. 9, 2015, 2 Pages.

Uzelac, et al., "Hardware-Based Load Value Trace Filtering for On-the-Fly Debugging", In Proceedings of ACM Transactions on Embedded Computing Systems, vol. 12, Issue 2, Article 97, May 2013, 18 pages.

"International Search Report and Written Opinion Issued in PCT Application No. PCT/US2018/038875", dated Sep. 6, 2018, 13 Pages.

"Non Final Office Action Issued in U.S. Appl. No. 16/029,372", dated Nov. 6, 2019, 38 Pages.

Lee, et al., "Offline Symbolic Analysis to Infer Total Store Order", In Proceedings of IEEE 17th International Symposium on High Performance Computer Architecture, Feb. 12, 2011, pp. 357-368.

Wang, et al., "Restore: Symptom-Based Soft Error Detection in Microprocessors", In Journal of IEEE Transactions on Dependable and Secure Computing, vol. 3 , Issue: 3, Aug. 14, 2006, pp. 188-201.

"Final Office Action Issued in U.S. Appl. No. 16/029,372", dated May 28, 2020, 27 Pages.

Nagarajan, et al., "ECMon: Exposing Cache Events for Monitoring", In Proceedings of 36th International Symposium on Computer Architecture, Jun. 20, 2009, pp. 349-360.

Zhao, et al., "Dynamic Cache Contention Detection in Multi-threaded Application", In Proceedings of the 7th ACM SIGPLAN/SIGOPS International Conference on Virtual Execution Environments, Mar. 9, 2011, pp. 27-37.

"Office Action Issued in European Patent Application No. 17801198.7", dated Aug. 20, 2020, 7 Pages.

"Non-Final Office Action Issued in U.S. Appl. No. 16/029,372", dated Oct. 7, 2020, 28 Pages.

"Final Office Action Issued in U.S. Appl. No. 16/029,372", dated Feb. 2, 2021, 26 Pages.

"Summons to Attend Oral Proceedings Issued in European Patent Application No. 17801198.7", dated Aug. 4, 2021, 8 Pages.

(56) References Cited

OTHER PUBLICATIONS

"Office Action Issued in Chile Patent Application No. 202000645", dated Jul. 19, 2021, 12 Pages.
"Office Action Issued in Chile Patent Application No. 202000645", dated Oct. 12, 2021, 12 Pages.
"Office Action Issued in Indian Patent Application No. 201947019259", dated Sep. 22, 2021, 7 Pages.
"First Office Action and Search Report Issued in Chinese Patent Application No. 201780069596.2", dated Jan. 6, 2022, 16 Pages.
"Office Action Issued in Russian Patent Application No. 2020113601", dated Jan. 31, 2022, 9 Pages.
Zhou, et al., "RReplay: A Record and Replay System Based on Restricted Multi-threading", In Proceedings of the International Conference on Computer Science and Service System, Aug. 11, 2012, pp. 2247-2250.
Junkang, Nong, "Research on Virtual Machine Based Deterministic Execution of Multi-core System", in Thesis Submitted for the Degree of Master of Engineering, Nov. 2011, 88 Pages.
"Office Action Issued in Indian Patent Application No. 202047005079", dated Mar. 4, 2022, 6 Pages.
"Notice of Allowance Issued in European Patent Application No. 17801198.7", dated Mar. 17, 2022, 2 Pages.
"Second Office Action Issued in Chinese Patent Application No. 201780069596.2", dated Apr. 27, 2022, 11 Pages.
"Office Action Issued in Japanese Patent Application No. 2020-509444", dated May 10, 2022, 6 Pages.
"Notice of Allowance Issued in Russian Patent Applicant No. 2020113601", dated May 11, 2022, 20 Pages.
"Office Action Issued in Indian Patent Application No. 202047030222", dated Jun. 15, 2022, 6 Pages.
"Notice of Allowance Issued in Chile Patent Application No. 202000645", dated Jun. 9, 2022, 2 Pages.
"Search Report Issued in European Patent Application No. 22158923.7", dated Jul. 6, 2022, 12 Pages.
Chen, et al.,"Deterministic Replay: a Survey" In the Journal of ACM Computing Surveys, vol. 48, Issue 2, Sep. 24, 2015, 47 Pages.
"Notice of Allowance Issued in Chinese Patent Application No. 201780069596.2", dated Jul. 14, 2022, 6 Pages.
Long, et al., "A Replay System for Performance Analysis of Multi-Threaded Programs", In Journal of Computer and Development, vol. 52, Issue 1, 2015, pp. 45-55. Research.
"Notice of Allowance Issued in Israel Patent Application No. 272745", dated Aug. 4, 2022, 3 Pages.
"Notice of Allowance Issued in Japanese Patent Application No. 2020-509444", dated Sep. 6, 2022, 5 Pages.
"Notice of Allowance Issued in Korean Patent Application No. 10-2020-7011236", dated Sep. 28, 2022, 8 Pages.
"Office Action Issued in Colombian Patent Application No. NC2020/0002932", dated Sep. 28, 2022, 10 Pages.
"Office Action Issued in Indonesian Patent Application No. P00202002113", dated Oct. 17, 2022, 4 Pages.
"Office Action Issued in Australian Patent Application No. 2018334370", dated Nov. 18, 2022, 2 Pages.
"Notice of Allowance Issued in Australian Patent Application No. 2018334370", dated Dec. 12, 2022, 3 Pages.
"Notice of Allowance Issued in Chinese Patent Application No. 201880060330.6", dated Jul. 6, 2023, 4 Pages.
"Non-Final Office Action Issued in U.S. Appl. No. 17/473,627", dated Mar. 31, 2023, 31 Pages.
"Notice of Allowance Issued in Indonesian Patent Application No. P00202002113", dated Mar. 17, 2023, 4 Pages.
"First Office Action and Search Report Issued in Chinese Patent Application No. 201880060330.6", dated Mar. 25, 2023, 11 Pages.
"Office Action Issued in Mexican Patent Application No. MX/a/2020/002865", dated Jul. 18, 2023, 5 Pages.
"Notice of Allowance Issued in U.S. Appl. No. 17/473,627", dated Sep. 8, 2023, 16 Pages.
"Office Action Issued in New Zealand Patent Application No. 761306", dated Oct. 9, 2023, 2 Pages.
U.S. Appl. No. 15/349,555, filed Nov. 11, 2016.
U.S. Appl. No. 16/029,372, filed Jul. 6, 2018.
U.S. Appl. No. 17/473,627, filed Sep. 13, 2021.
U.S. Appl. No. 15/253,027, filed Aug. 31, 2016.
U.S. Appl. No. 15/915,930, filed Mar. 8, 2018.
U.S. Appl. No. 62/559,780, filed Sep. 18, 2017.
U.S. Appl. No. 14/319,092, filed Jun. 30, 2014.
U.S. Appl. No. 14/751,638, filed Jun. 26, 2015.
U.S. Appl. No. 62/143,435, filed Apr. 6, 2015.
U.S. Appl. No. 16/057,353, filed Aug. 7, 2018.
U.S. Appl. No. 15/252,998, filed Aug. 31, 2016.
U.S. Appl. No. 16/372,705, filed Apr. 2, 2019.
U.S. Appl. No. 15/298,439, filed Oct. 20, 2016.
U.S. Appl. No. 15/637,376, filed Jun. 29, 2017.
U.S. Appl. No. 15/349,474, filed Nov. 11, 2016.
U.S. Appl. No. 15/433,918, filed Feb. 15, 2017.
U.S. Appl. No. 15/604,408, filed May 24, 2017.
U.S. Appl. No. 16/686,564, filed Nov. 18, 2019.
U.S. Appl. No. 17/515,705, filed Nov. 1, 2021.
U.S. Appl. No. 15/604,334, filed May 24, 2017.
U.S. Appl. No. 16/377,470, filed Apr. 8, 2019.
U.S. Appl. No. 16/374,172, filed Apr. 3, 2019.
U.S. Appl. No. 17/155,892, filed Jan. 22, 2021.
U.S. Appl. No. 15/488,282, filed Apr. 14, 2017.
U.S. Appl. No. 62/480,408, filed Apr. 1, 2017.
U.S. Appl. No. 15/872,453, filed Jan. 16, 2018.
U.S. Appl. No. 15/904,072, filed Feb. 23, 2018.
U.S. Appl. No. 15/947,699, filed Apr. 6, 2018.
"Notice of Allowance Issued in New Zealand Patent Application No. 761306", dated Oct. 16, 2023, 2 Pages.

* cited by examiner

TRACE RECORDING BY LOGGING INFLUXES TO AN UPPER-LAYER SHARED CACHE, PLUS CACHE COHERENCE PROTOCOL TRANSITIONS AMONG LOWER-LAYER CACHES

BACKGROUND

When writing code during the development of software applications, developers commonly spend a significant amount of time "debugging" the code to find runtime and other source code errors. In doing so, developers may take several approaches to reproduce and localize a source code bug, such as observing the behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

Several considerations can be taken into account when recording trace files. Most prominently, there is an inherent tradeoff between the robustness of the trace data recorded and the overheads incurred by tracing a program. These tradeoffs are manifest primarily in trace file size and performance impacts on execution of the traced program. Moreover, since tracing might be accomplished with hardware assistance (or entirely in software), there may also be hardware design and other hardware cost considerations.

BRIEF SUMMARY

Embodiments described herein are directed to mechanisms for creating bit-accurate "time travel" trace recordings using hardware assistance by a processor. These mechanisms are based on tracing the effects of execution across a plurality of processing units on at least two tiers or layers of processor caches. In particular, these mechanisms could modify a processor's hardware and/or microcode so that it assists in recording (i) the influxes (i.e., cache misses) to an outer or "upper-layer" shared processor cache, as well as (ii) cache coherence protocol (CCP) transitions among a plurality of inner or "lower-layer" processor caches that are backed by the outer/upper-layer shared processor cache. These techniques can be extended to "N" levels of caches. Recording trace files in this manner may require only modest processor modifications and, when compared to prior trace recording approaches, it can reduce by several orders of magnitude both the performance impact of trace recording as well as trace file size.

Embodiments are directed to computing device(s) that include a plurality of processing units, a plurality of (N-1)-level caches, and an N-level cache that is associated with two or more of the plurality of (N-1)-level caches. The N-level cache is configured as a backing store for the two or more (N-1)-level caches. The computing device(s) include control logic that configures the computing device(s), based at least on detecting one or more influxes of data to a particular location in the N-level cache during execution across the plurality of processing units, to cause the one or more influxes of data to the particular location in the N-level cache to be logged. The control logic also configures the computing device(s) to cause one or more (N-1)-level CCP transitions between the two or more (N-1)-level caches to be logged. The (N-1)-level CCP transitions result from the particular location being accessed by two or more of the plurality of processing units.

Embodiments are also directed to methods for trace recording based on data influxes to an outer-level cache and CCP transitions between inner caches. These methods are implemented at a computing device that includes (i) a plurality of processing units, (ii) a plurality of (N-1)-level caches, and (iii) an N-level cache that is associated with two or more of the plurality of (N-1)-level caches and that is configured as a backing store for the two or more (N-1)-level caches. The method includes, based at least on detecting one or more influxes of data to a particular location in the N-level cache during execution across the plurality of processing units, causing the one or more influxes of data to the particular location in the N-level cache to be logged. The method also includes causing one or more (N-1)-level cache coherence protocol (CCP) transitions between the two or more (N-1)-level caches to be logged, the (N-1)-level CCP transitions resulting from the particular location being accessed by two or more of the plurality of processing units.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments described herein are directed to mechanisms for creating bit-accurate "time travel" trace recordings using hardware assistance by a processor. These mechanisms are based on tracing the effects of execution across a plurality of processing units on at least two tiers or layers of processor caches. In particular, these mechanisms could modify a processor's hardware and/or microcode so that it assists in recording (i) the influxes (i.e., cache misses) to an outer or "upper-layer" shared processor cache, as well as (ii) cache coherence protocol (CCP) transitions among a plurality of inner or "lower-layer" processor caches that are backed by the outer/upper-layer shared processor cache. These techniques can be extended to "N" levels of caches. Recording trace files in this manner may require only modest processor modifications and, when compared to prior trace recording approaches, it can reduce by several orders of magnitude both the performance impact of trace recording as well as trace file size.

Figure 1:
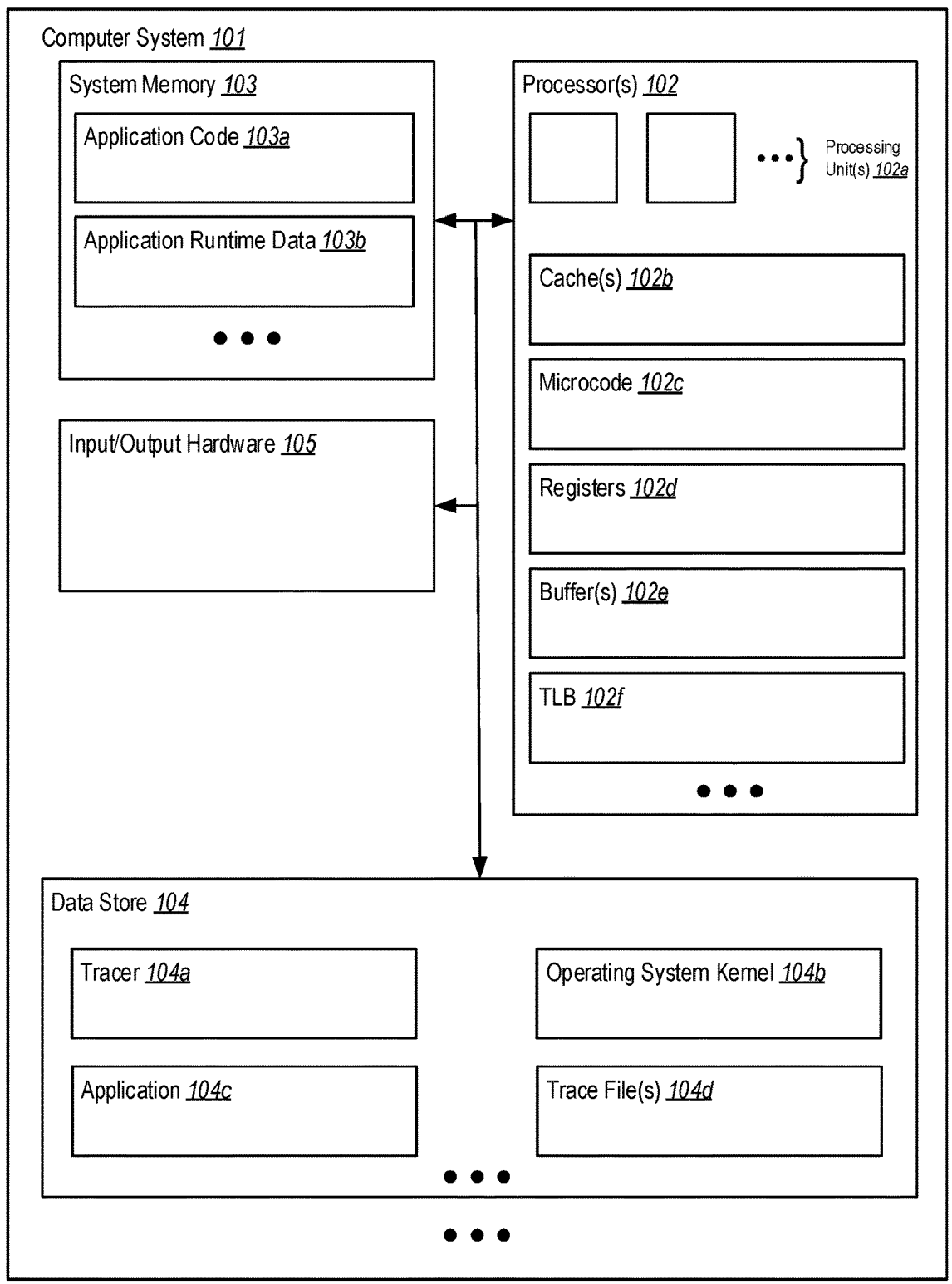
FIG. 1 illustrates an example computing environment that facilitates recording "bit-accurate" traces of a plurality of threads of an application by recording effects on two or more layers of processor caches as a plurality of processing units execute those threads, including recording influxes to an upper-layer shared processor cache as well as cache coherence protocol (CCP) transitions among a plurality of lower-layer processor caches.

FIG. 1 illustrates an example computing environment 100 that facilitates recording "bit-accurate" traces of a plurality of threads of an application by recording effects on two or more layers of processor caches as a plurality of processing units execute those threads, including recording influxes to an upper-layer shared processor cache as well as CCP transitions among a plurality of lower-layer processor caches. As depicted, embodiments may comprise or utilize a special-purpose or general-purpose computer system 101 that includes computer hardware, such as, for example, one or more processor(s) 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As illustrated, the data store 104 can store computer-executable instructions and/or data structures representing application programs such as, for example, a tracer 104a, an operating system kernel 104b, and application 104c (e.g., the application that is the subject of tracing by the tracer 104a, and one or more trace file(s) 104d). When these programs are executing (e.g., using the processor(s) 102), the system memory 103 can store corresponding runtime data, such as runtime data structures, computer-executable instructions, etc. Thus, FIG. 1 illustrates the system memory 103 as including runtime application code 103a and application runtime data 103b (e.g., each corresponding with application 104c).

The tracer 104a is usable to record a bit-accurate trace of execution of an application, such as application 104c, and to store trace data in the trace file(s) 104d. In some embodiments, the tracer 104a is a standalone application, while in other embodiments the tracer 104a is integrated into another software component, such as the operating system kernel 104b, a hypervisor, a cloud fabric, etc. While the trace file(s) 104d are depicted as being stored in the data store 104, the trace file(s) 104d may also be recorded exclusively or temporarily in the system memory 103, or at some other storage device. As clarified later, the tracer 104a may interoperate with specific features of the processor(s) 102 that enable tracing utilizing the processor's CCP.

FIG. 1 includes a simplified representation of the internal hardware components of the processor(s) 102. As illustrated, each processor 102 includes a plurality of processing unit(s) 102a. Each processing unit may be physical (i.e., a physical processor core) and/or logical (i.e., a logical core presented by a physical core that supports hyper-threading, in which more than one application threads executes at the physical core). Thus, for example, even though the processor 102 may in some embodiments include only a single physical processing unit (core), it could include two or more logical processing units 102a presented by that single physical processing unit.

Each processing unit 102a executes processor instructions that are defined by applications (e.g., tracer 104a, operating kernel 104b, application 104c, etc.), and which instructions are selected from among a predefined processor instruction set architecture (ISA). The particular ISA of each processor 102 varies based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, an "instruction" is the smallest externally-visible (i.e., external to the processor) unit of code that is executable by a processor.

Each processing unit 102a obtains processor instructions from one or more processor cache(s) 102b, and executes the processor instructions based on data in the cache(s) 102b, based on data in registers 102d, and/or without input data. In general, each cache 102b is a small amount (i.e., small relative to the typical amount of system memory 103) of random-access memory that stores on-processor copies of portions of a backing store, such as the system memory 103 and/or another cache in the cache(s) 102b. For example, when executing the application code 103a, one or more of the cache(s) 102b contain portions of the application runtime data 103b. If the processing unit(s) 102a require data not already stored in a particular cache 102b, then a "cache miss" occurs, and that data is fetched from the system memory 103 or another cache, potentially "evicting" some other data from that cache 102b.

Often times, the processor cache(s) 102b are divided into separate tiers, layers, or levels—such as layer 1 (L1), layer 2 (L2), layer 3 (L3), etc. Depending on processor implementation, tiers could be part of the processor 102, itself (e.g., L1 and L2), and/or could be separate from the processor 102 (e.g., L3). Thus, the cache(s) 102b of FIG. 1 may comprise one of these layers (L1) or may comprise a plurality of these layers (e.g., L1 and L2, and even L3). FIG.

Figure 2A:
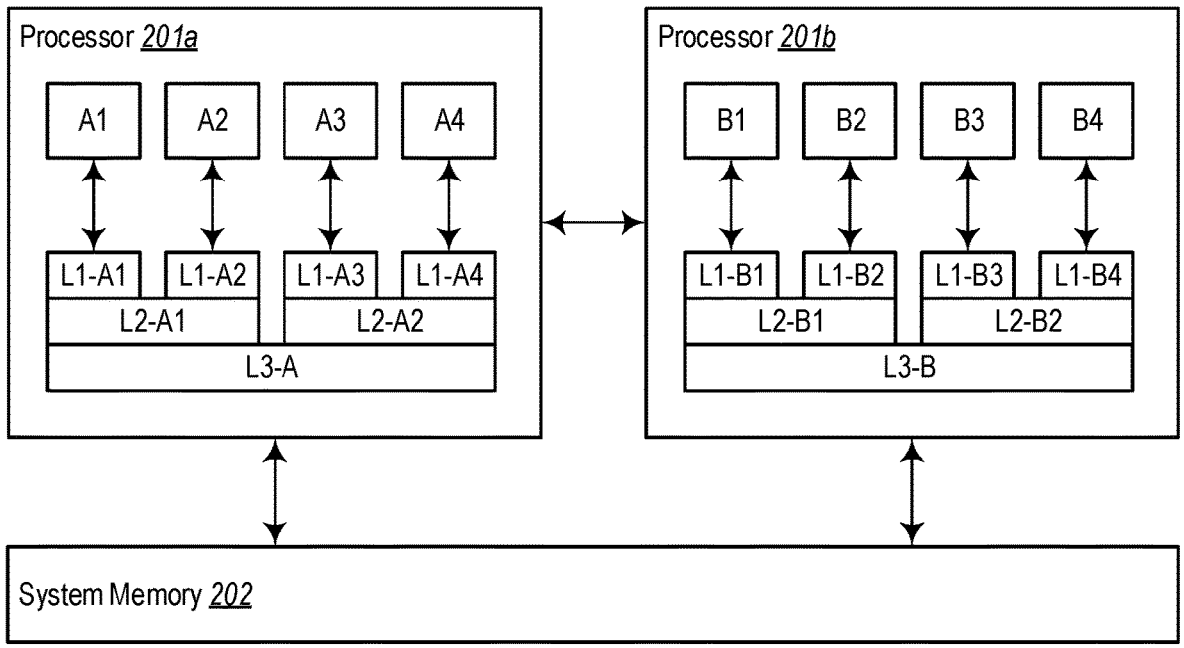
FIG. 2A illustrates an example computing environment including multi-layer caches.

2A illustrates an example environment 200 demonstrating multi-layer caches. In FIG. 2A, there are two processors 201a and 201b (e.g., each corresponding to a different processor 102 of FIG. 1) and a system memory 202 (e.g., corresponding to system memory 103 of FIG. 1). In the example environment 200, each processor 201 includes four physical processing units (i.e., units A1-A4 for processor 201a and units B1-B4 for processor 210b).

Example environment 200 also includes a three-layer cache within each processing unit 201. Environment 200 is one example layout only, and it not limiting to the cache hierarchies in which the embodiments herein may operate. In environment 200, at a lowest or most inner layer each processing unit is associated with its own dedicated L1 cache (e.g., L1 cache "L1-A1" in processor 201a for unit A1, L1 cache "L1-A2" in processor 201a for unit A2, etc.). Moving up a layer, each processing unit 201 includes two L2 caches (e.g., L2 cache "L2-A1" in processor 201a that serves as a backing store for L1 caches L1-A1 and L1-A2, L2 cache "L1-A2" in processor 201a that serves as a backing store for L1 caches L1-A3 and L1-A4, etc.). Finally, at the highest or most outer layer, each processing unit 201 includes a single L3 cache (e.g., L3 cache "L3-A" in processor 201a that serves as a backing store for L2 caches L2-A1 and L2-A2, and L3 cache "L3-B" in processor 201b that serves as a backing store for L2 caches L2-B1 and L2-B2). As shown, system memory 202 serves as a backing store for the L3 caches L3-A and L3-B.

As demonstrated in FIG. 2A, when multiple cache layers are used, the processing unit(s) 102a interact directly with the lowest layer (L1). In most cases, data flows between the layers (e.g., on a read an L3 cache interacts with the system memory 103 and serves data to an L2 cache, and the L2 cache in turn serves data to the L1 cache). When a processing unit 102a performs a write, the caches coordinate to ensure that those caches that have affected data that was shared among the processing unit(s) 102a don't have it anymore. This coordination is performed using a CCP.

The caches in environment 200 may thus be viewed as "shared" caches. For example, each L2 and L3 cache serves multiple processing units within a given processor 201 and are thus shared by the processing units. The L1 caches within a given processor 201, collectively, can also be considered shared—even though each one corresponds to a single processing unit—because the individual L1 caches may coordinate with each other (i.e., via a CCP) to ensure consistency (i.e., so that each cached memory location is viewed consistently across all the L1 caches). The L2 caches within each processor 201 similarly may coordinate via a CCP. Additionally, if the processor 201 supports hyper-threading, each individual L1 cache may be viewed being shared by two or more logical processing units and are thus "shared" even at an individual level.

Figure 2B:
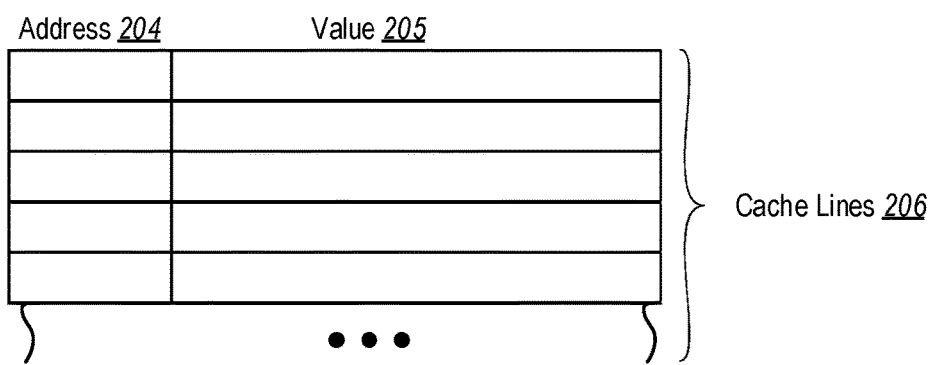
FIG. 2B illustrates an example of a cache.

Typically, each cache comprises a plurality of "cache lines." Each cache line stores a chunk of memory from its backing store (e.g., system memory 202 or a higher-layer cache). For example, FIG. 2B illustrates an example of at least a portion of a cache 203, which includes a plurality of cache lines 206, each of which comprises at least an address portion 204 and a value portion 205. The address portion 204 of each cache line 206 is configured to store an address in system memory 202 for which the cache line corresponds, and the value portion 205 initially stores a value received from the system memory 202. The value portion 205 can be modified by the processing units, and eventually be evicted back to the backing store. As indicated by the ellipses, a cache 203 can include a large number of cache lines. For example, a contemporary INTEL processor may contain individual L1 caches comprising 512 or more cache lines. In such a cache, each cache line is typically usable to store a 64-byte (512-bit) value in reference to an 8-byte (64-bit) memory address. As visually indicated in FIG. 2A, cache sizes typically increase with each layer (i.e., L2 caches are typically larger than L1 caches, L3 caches are typically larger than L2 caches, etc.).

The address stored in the address portion 204 of each cache line 206 may be a physical address, such as the actual memory address in the system memory 202. Alternatively, the address stored in the address portion 204 may be a virtual address, which is an address that is mapped to the physical address to provide an abstraction (e.g., using operation-system managed page tables). Such abstractions can be used, for example, to facilitate memory isolation between different processes executing at the processor(s) 102, including isolation between user-mode processes and kernel mode processes associated with the operating system kernel 104b. When virtual addresses are used, a processor 102 may include a translation lookaside buffer (TLB) 102f (usually part of a memory management unit (MMU)), which maintains recently-used memory address mappings between physical and virtual addresses.

The cache(s) 102b may include code cache portions and data cache portions. When executing the application code 103 a, the code portion(s) of the cache(s) 102b may store at least a portion of the processor instructions stored in the application code 103a and the data portion(s) of the cache(s) 102b may store at least a portion of data structures of the application runtime data 103b. In addition, caches can be inclusive, exclusive, or include both inclusive and exclusive behaviors. For example, in an inclusive cache an L3 layer would store a superset of the data in the L2 layers below it, and the L2 layers store a superset of the L1 layers below them. In exclusive caches, the layers may be disjointed—for example, if data exists in an L3 cache that an L1 cache needs, they may swap information, such as data, address, and the like.

Retuning to FIG. 1, each processor 102 also includes microcode 102c, which comprises control logic (i.e., executable instructions) that control operation of the processor 102, and which generally functions as an interpreter between the hardware of the processor and the processor ISA exposed by the processor 102 to executing applications. The microcode 102 is typically embodied on on-processor storage, such as ROM, EEPROM, etc.

Registers 102d are hardware-based storage locations that are defined based on the ISA of the processors(s) 102 and that are read from and/or written to by processor instructions. For example, registers 102d are commonly used to store values fetched from the cache(s) 102b for use by instructions, to store the results of executing instructions, and/or to store status or state—such as some of the side-effects of executing instructions (e.g., the sign of a value changing, a value reaching zero, the occurrence of a carry, etc.), a processor cycle count, etc. Thus, some registers 102d may comprise "flags" that are used to signal some state change caused by executing processor instructions. In some embodiments, processors 102 may also include control registers, which are used to control different aspects of processor operation. Although FIG. 1 depicts registers 102d as a single box, it will be appreciated that each processing unit 102a typically includes one or more corresponding sets of registers 102d that are specific to that processing unit.

In some embodiments, the processor(s) 102 may include one or more buffers 102e. As will be discussed herein after, buffer(s) 102e may be used as a temporary storage location for trace data. Thus, for example, the processors(s) 102 may store portions of trace data the buffer(s) 102e, and flush that data to the trace file(s) 104d at appropriate times, such as when there is available memory bus bandwidth and/or free processor cycles.

As alluded to above, processors operate on the cache(s) 102b according to one or more CCPs. In general, a CCP defines how consistency is maintained between data among the various cache(s) 102b as the various processing units 102a read from and write to data in the various cache(s) 102b, and how to ensure that the various processing units 102a always read valid data from a given location in the cache(s) 102b. CCPs are typically related to and enable a memory model defined by the processor 102's ISA.

Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual locations (e.g., lines) in the cache(s) 102b. A "modified" cache location contains data that has been modified in the cache(s) 102b and is therefore inconsistent with the corresponding data in the backing store (e.g., system memory 103 or another cache). When a location having the "modified" state is evicted from the cache(s) 102b, common CCPs require the cache to guarantee that its data is written back the backing store, or that another cache take over this responsibility. A "shared" cache location contains data that is unmodified from the data in the backing store, exists in read-only state, and is shared by the processing unit(s) 102a. The cache(s) 102b can evict this data without writing it to the backing store. An "invalid" cache location contains no valid data and can be considered empty and usable to store data from cache miss. An "exclusive" cache location contains data that matches the backing store and is used by only a single processing unit 102a. It may be changed to the "shared" state at any time (i.e., in response to a read request) or may be changed to the "modified" state when writing to it. An "owned" cache location is shared by two or more processing units 102a, but one of the processing units has the exclusive right to make changes to it. When that processing makes changes, it notifies the other processing units—since the notified processing units may need to invalidate or update based on the CCP implementation.

The granularity with which different processors and/or different CCPs track cache coherence state and make that cache coherence data available to the tracer 104a can vary. For example, at one end of the spectrum, some processors/CCPs track cache coherence per cache line as well as per processing unit. These processors/CCPs can, therefore, track the state of each cache line as it relates to each processing unit. This means that a single cache line can have information about its state as it relates to each processing unit 102a. Other processors/CCPs are less granular, and track cache coherence the level of the cache line only (and lack per-processing unit information). At the other end of the spectrum, processor manufacturers may choose to track cache coherence at the level of the cache line only for efficiency, since only one processor can own a line exclusively (exclusive, modified, etc.) at a time. As a mid-granularity example, a processor/CCP may track cache coherence per cache line, as well as an index (e.g., 0, 1, 2, 3 for a four-processing unit processor) to the processing unit that has the current cache line state.

As alluded to, embodiments utilize the processor 102's cache(s) 102b to efficiently record a bit-accurate trace of execution of an application 104c and/or the operating system kernel 104b. These embodiments are built upon an observation by the inventor that the processor 102 (including the cache(s) 102b) form a semi- or quasi-closed system. For example, once portions of data for a process (i.e., code data and runtime application data) are loaded into the cache(s) 102b, the processor 102 can run by itself—without any input—as a semi- or quasi-closed system for bursts of time. In particular, once the cache(s) 102b are loaded with data, one or more of the processing units 102a execute instructions from the code portion(s) of the cache(s) 102b, using runtime data stored in the data portion(s) of the cache(s) 102b and using the registers 102d.

When a processing unit 102a needs some influx of information (e.g., because an instruction it is executing, will execute, or may execute accesses code or runtime data not already in the cache(s) 102b), a "cache miss" occurs and that information is brought into the cache(s) 102b from the system memory 103. For example, if a data cache miss occurs when an executed instruction performs a memory operation at a memory address within the application runtime data 103b, data from that memory address is brought into one of the cache lines of the data portion of the cache(s) 102b. Similarly, if a code cache miss occurs when an instruction performs a memory operation at a memory address application code 103a stored in system memory 103, code from that memory address is brought into one of the cache lines of the code portion(s) of the cache(s) 102b. The processing unit 102a then continues execution using the new information in the cache(s) 102b until new information is again brought into the cache(s) 102b (e.g., due to another cache miss or an un-cached read).

The inventor has also observed that, in order to record a bit-accurate representation of execution of an application, the tracer 104a can record sufficient data to be able to reproduce the influx of information into the cache(s) 102b as processing units execute that application's thread(s). The inventor has developed several approaches for recording such data, each with various benefits and drawbacks.

For example, a first approach records all of the data brought into the cache(s) 102b by logging all cache misses and un-cached reads (i.e., reads from hardware components and un-cacheable memory), along with a time during execution at which each piece of data was brought into the cache(s) 102b (e.g., using a count of instructions executed or some other counter). This approach is described in Applicant's co-pending application U.S. Ser. No. 15/349,555, filed Nov. 11, 2016 and titled "CACHE-BASED TRACING FOR TIME TRAVEL DEBUGGING AND ANALYSIS", the entire contents of which are incorporated by reference herein in their entirety. While this approach can be more straightforward to implement than the following approaches; however, while it typically records far smaller trace files than prior techniques, it may still record more data than is strictly necessary for a bit-accurate trace.

A second approach—which generally results in significantly smaller trace files than the first approach—is to track and record only the cache lines that were "consumed" by each processing unit 102a, rather than recording all the cache misses. As used herein, a processing unit has "consumed" a cache line when it is aware of its present value. This could be because the processing unit is the one that wrote the present value of the cache line, or because the processing unit performed a read on the cache line. Some embodiments of this second approach involves extensions to one or more of the cache(s) 102b (e.g., additional "logging" or "accounting" bits) that enable the processor 102 to identify, for each cache line, one or more processing units 102a that consumed the cache line. This approach is described in Applicant's co-pending applications, U.S. Ser. No. 15/298,439, filed Oct. 20, 2016 and titled "FACILITATING RECORDING A TRACE FILE OF CODE EXECUTION USING A PROCESSOR CACHE" and U.S. Ser. No. 15/604,334, filed May 24, 2017 and titled "FACILITATING RECORDING A TRACE FILE OF CODE EXEUCTION USING INDEX BITS IN A PROCESSOR CACHE", the entire contents of each of which are incorporated by reference herein in their entirety.

A third approach—which generally results in still smaller trace files than the first and second approaches—is to utilize the processor's CCP to determine a subset of the "consumed" cache lines to record in the file(s) 104d, and which will still enable activity of the cache(s) 102b to be reproduced. This approach operates at a single cache level (e.g., L1) and logs influxes of data to that cache level, along with a log of CCP operations at the granularity of the processing unit that caused a given CCP operation. This includes logging which processing unit(s) previously had read and/or write access to a cache line. However, robust support for this third approach may lead to extensive modifications to a processor's CCP logic, since it operates at the granularity of which processing unit caused a CCP operation. This third approach is described in Applicant's provisional application U.S. Ser. No. 62/559,780, filed Sep. 18, 2017 and titled "CACHE-BASED TRACE RECORDING USING CACHE COHERENCE PROTOCOL DATA", the entire contents of which are incorporated by reference herein in their entirety.

According to embodiments herein, a fourth approach operates at two or more cache levels. In particular, it logs influxes of data to an "upper-level" shared cache (e.g., at the L2 or L3 level in FIG. 2A). It also uses a CCP of at least one "lower-level" cache (e.g., the CCP of the L1 caches in FIG. 2A, if the shared cache was L2; or the CCP of the L2 caches in FIG. 2A, if the shared cache was L3) to log a subset of CCP state transitions for each cached memory location (i.e., between sections of "load" operations and sections of "store" operations). The effect is to log less CCP data than the third approach (i.e., since it records far less CCP state data than the third approach, since it records based on load/store transitions rather than per-processing unit activity). In implementations, such logs may be post-processed and augmented to reach the level of detail recorded in the third approach, but may be implemented using less costly hardware modifications than the third approach (e.g., because less CCP data needs to be tracked and recorded by the processor 102).

As mentioned, this fourth approach records transitions between sections of "load" operations and sections of "store" operations. For ease in description, the examples herein map the cache line states (i.e., Modified, Owned, Exclusive, Shared, and Invalid) used in the CCPs discussed above (i.e., MSI, MESI, and MOESI) to one of a "load" state (i.e., the cache line has been read from) or a "store" state (i.e., the cache line has been written to). Table 1 below shows a non-limiting example mapping. It will be appreciated that there could exist CCPs and states other than the ones discussed herein, and one of ordinary skill in the art will recognize, in view of the disclosure herein, that similar mappings can be made with many different CCPs. Alternatively, implementations could record transitions between actual CCP states (e.g., Modified, Owned, Exclusive, and Shared), rather than a mapped state.

TABLE 1

| Protocol State | Mapped State |
|---|---|
| Modified | Store |
| Owned | Load |
| Exclusive | Store |
| Shared | Load |
| Invalid | No mapping - cache line is considered empty and no transitions are tracked |

Figure 3:
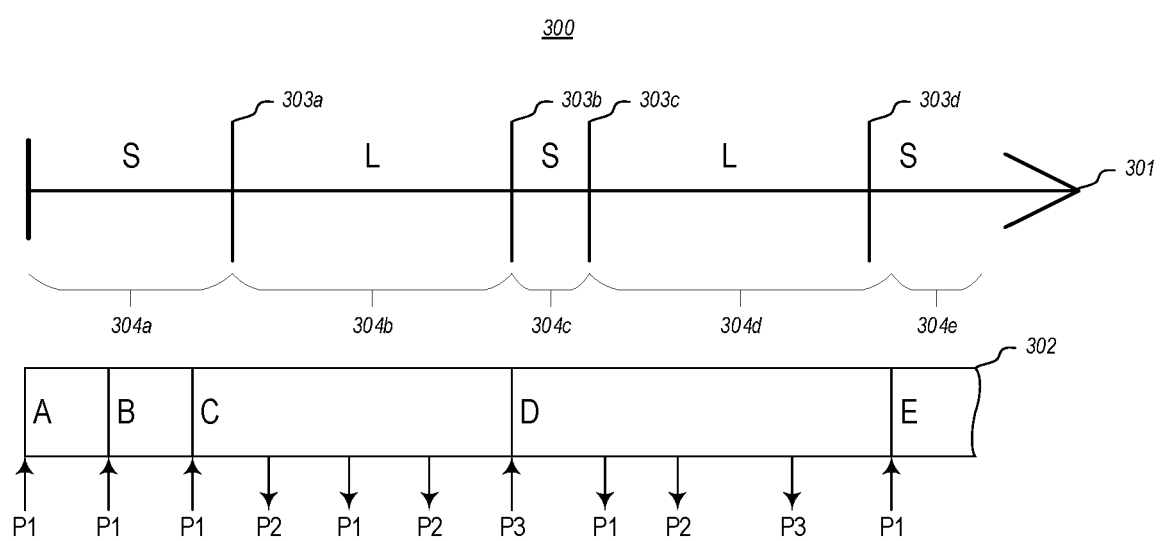
FIG. 3 illustrates an example of transitions between load and store states as a cache line is read from and written to by a plurality of processing units.

FIG. 3 illustrates an example 300 of transitions among the load and store states of Table 1, as a cache line is read from and written to by a plurality of processing units. In particular, FIG. 3 illustrates a first timeline 301 showing transitions among sections of loads and sections of stores, based on the load and store operations shown on a second timeline 302 showing cache line activity.

As shown at the far left of timeline 302, processing unit P1 stored value A to the cache line, and then stored values B and C to the cache line. During this period of stores 304a, P1 could have had the cache line in an "exclusive" CCP state, for example. Next, timeline 302 shows that processing unit P2 performed a load, reading value C. Correspondingly, timeline 301 shows this as a point of transition 303a from the period 304a of stores to a period 304b of loads. During period 304b, there were multiple loads by P1 and P2, each reading the value C. Period 304b could correspond, for example, to a time period in which the cache line was in a "shared" CCP state. The next store is by P3, and it wrote the value D. This is shown in timeline 301 as another point of transition 303b between the period 304b of loads to a new period 304c of stores. The next activity was a load by P1 (reading value D), which is shown as a new point of transition 303c between the period 304c of stores to a new period 304d of loads. This period 304d includes loads by P1, P2, and P3, each reading value D. Finally, timeline 302 shows a store by P1, writing value E. This is shown as a final point of transition 303d between the period 304d of loads to a new period 304e of stores.

According to embodiments herein, CCP-based data that is logged for the cache line, based on the activity FIG. 3, could include the identity of each point of transition 303a-303d. This data is usable at replay to determine an order in which the processing units (i.e., P1, P2, and P3) executed. Then, by replaying the code that executed at each processing unit—in the order identified by the logged CCP data—the values read from and/or written to the cache line can be reconstructed. While the values can be reconstructed at replay time, some embodiments may record a more robust trace by also logging the value of the cache line at one or more of the points of transition. Other CCP-based data that could be logged, such as which processing units(s) accessed the cache between each transition point.

In FIG. 3, each load/store transition also corresponds to a transition between processing units. However, embodiments could log one or more load/store transitions by an individual processing unit. For example, if, at point of transition 303a, the load had been performed by P1 instead of P2, then this point of transition 303a would have been a transition by an individual processing unit (i.e., P1). Embodiments could log such transitions in addition to, or even as an alternative to, logging load/store transitions that correspond to transitions between processing units.

Of course, other log data could be recorded to help reconstruct the order in which the processing units executed. For example, embodiments could occasionally (e.g., every N instructions, where N could be on the order of millions of instructions or more) log a hash of each processor 102's register values (or similar) so help the replay engine pick among multiple potential execution paths.

Figure 4:
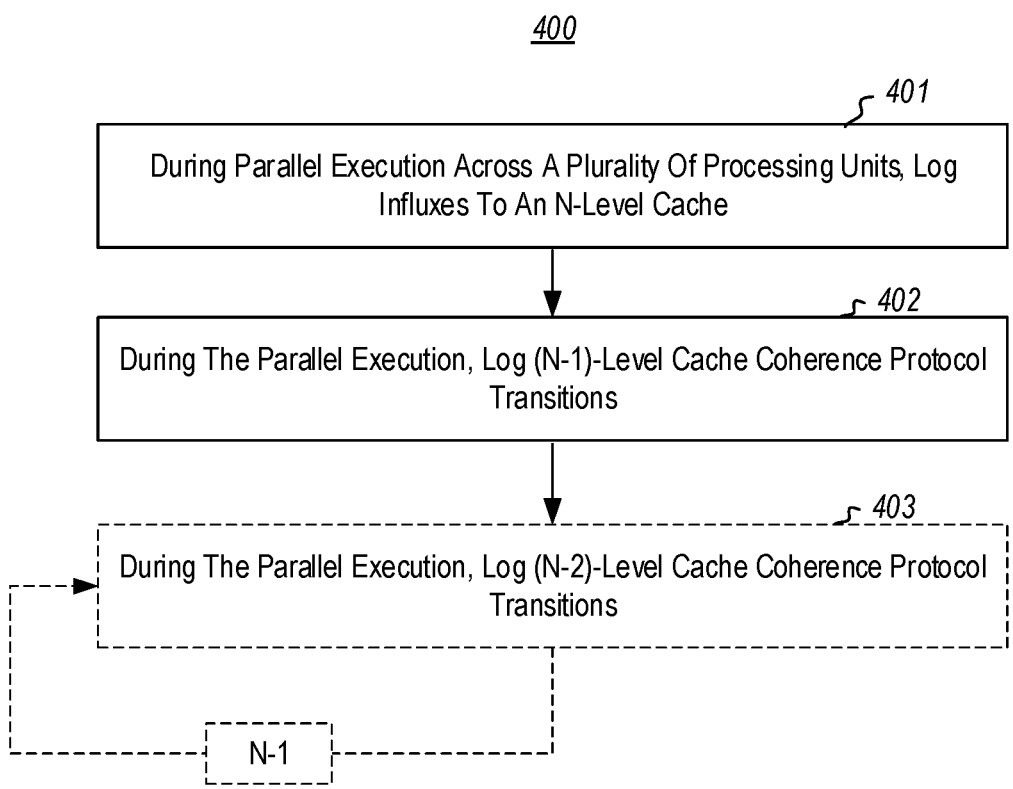
FIG. 4 illustrates a flowchart of an example method for trace recording based on data influxes to an outer-level cache and CCP transitions between inner caches.

FIG. 4 illustrates an example of a method 400 for trace recording based on data influxes to an outer-level cache and CCP transitions between inner caches. FIG. 4 is now described in the context of FIGS. 1-3, and in view of the additional example computing environments 500a and 500b of FIGS. 5A and 5B.

In general, method 400 operates in environments that include a plurality of processing units and two or more cache layers, in which an outer or higher-level cache layer (i.e., N-level) serves as a backing store for an inner or lower-level cache layer (i.e., (N-1)-level). The inner or lower-level cache layer could, in turn, serve as a backing store for yet another inner or even lower-level cache layer (i.e., (N-2)-level). These layers can continue inward for any number of layers. Although not required, in many environments each individual cache in the innermost or lowest-layer cache layer corresponds to a single physical processing unit.

Figure 5A:
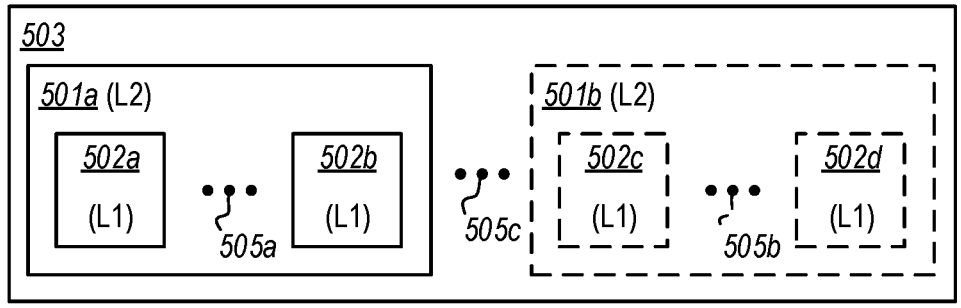
FIG. 5A illustrates an example computing environment that includes an N-level cache layer and a plurality of (N-1)-level cache layers.
Figure 5B:
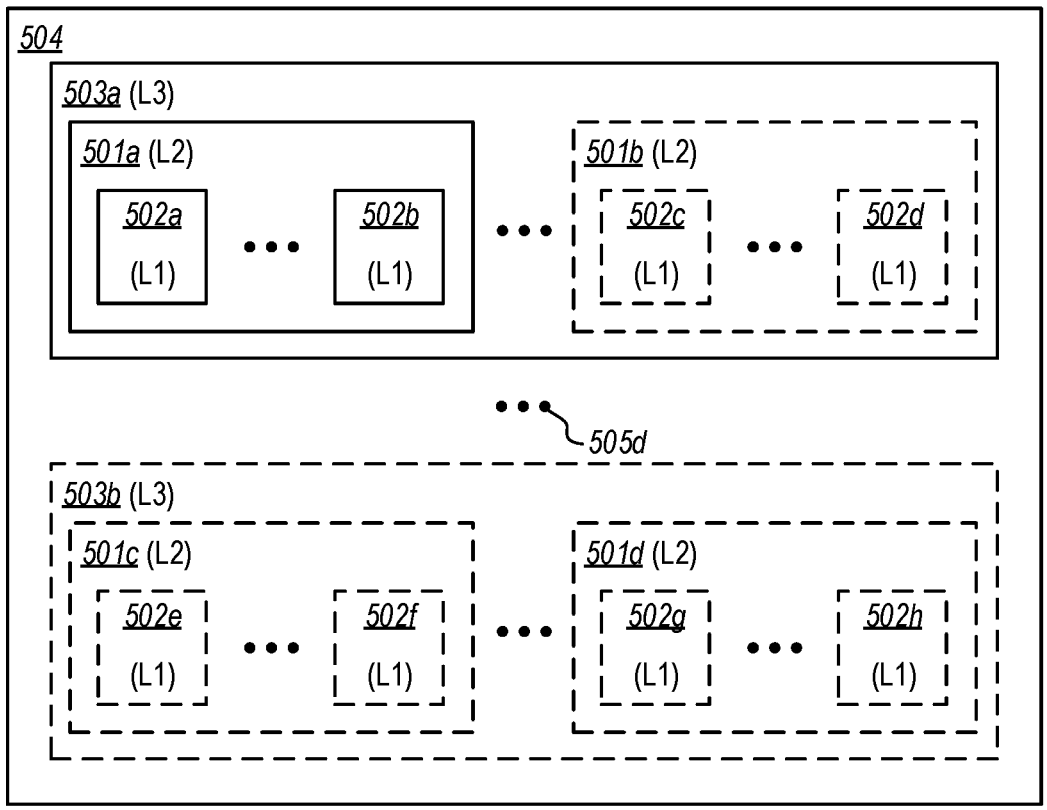
FIG. 5B illustrates an example computing environment that includes an N-level cache layer, a plurality of (N-1)-level cache layers, and a plurality of (N-2)-level cache layers.

FIGS. 5A and 5B illustrate these concepts. FIG. 5A illustrates an example 500a of a computing environment 503 that includes two cache layers—i.e., N-level and (N-1)-level. For example, FIG. 5A depicts at least one N-level cache 501a. In FIG. 5A, this N-level cache 501a is depicted as being an L2 cache layer. Below this N-level cache 501a, FIG. 5A shows two (N-1)-level caches 502a and 502b, though there could be more than two (N-1)-level caches 502, as indicated by the ellipses 505a. In FIG. 5A, the (N-1)-level caches 502 are depicted as being L1 cache layers. While processing units are not expressly shown in FIG. 5A, in many processor environments each (N-1)-level cache 502 may correspond to a single physical processing unit. Thus, in one example, the N-level cache 501a could correspond to one processor socket containing two or more physical cores, each associated with its own (N-1)-level cache 502.

As indicated by the ellipses 505c and N-level cache 501b, there could be any number of the N-level caches 501 (and corresponding lower-level caches). For example, each N-level cache 501 could, in some processing environments, correspond to a different processor socket. However, in other processing environments, such as non-uniform memory access (NUMA) processing environments, these N-level caches 501 could be "groups" within the same processor socket, which are each backed by distinct memories or memory segments.

FIG. 5B, on the other hand, illustrates an example 500b of a computing environment 504 that includes three cache layers—i.e., N-level, (N-1)-level, and (N-2)-level. Here, example 500b includes at least one N-level cache 503a (e.g., an L3 cache), which includes two or more (N-1)-level caches 501a (e.g., L2 caches), and which in turn each includes two or more (N-2)-level caches 502 (e.g., L1 caches). Again, as indicated by the ellipses 505d and N-level cache 503b, there could be any number of the N-level caches 503 (and corresponding lower-level caches). While processing units are again not expressly shown in FIG. 5B, in many processor environments each (N-2)-level cache 502 may correspond to a single physical processing unit, and each (N-1)-level cache 501 and (N)-level cache 503 may correspond to multiple processing units.

Returning now to FIG. 4, method 400 operates during execution across a plurality of processing units. FIG. 4 can operate, for example, in order to facilitate tracing execution of a plurality of threads. A shown, method 400 includes an act 401 of, during parallel execution across a plurality of processing units, logging influxes to an N-level cache. In some embodiments, act 401 can comprise, based at least on detecting one or more influxes of data to a particular location in the N-level cache during execution across the plurality of processing units, causing the one or more influxes of data to the particular location in the N-level cache to be logged. For example, during execution across the processing units (e.g., by one or more of the plurality of threads) there may be one or more cache misses that causes data for a particular memory location in system memory 103 to be imported into an outer cache. In the environment 503 of FIG. 5A, this may mean that the particular memory location is cached in a cache line of N-level cache 501a (e.g., an L2 cache) for each cache miss. In the environment 504 of FIG. 5B, on the other hand, this may mean that the particular memory location is cached in a cache line of N-level cache 503a (e.g., an L3 cache) for each cache miss. As a result of these cache misses, the circuitry and/or microcode 102c of processor(s) 102 can initiate logging of the data that was imported to this outer cache to be logged to trace file(s) 104d. Alternatively, act 401 could be initiated by a tracer 104a, including an operating system kernel 104b and/or hypervisor.

Method 400 also includes and act 402 of, during the parallel execution, logging (N-1)-level cache coherence protocol transitions (e.g., among a plurality of (N-1)-level caches). In some embodiments, act 402 can comprise causing one or more (N-1)-level CCP transitions between the two or more (N-1)-level caches to be logged, the (N-1)-level CCP transitions resulting from the particular location being accessed by two or more of the plurality of processing units. For example, while cache misses might initially fill an outer/higher-level cache (e.g., N-level cache 501a in FIG. 5A or N-level cache 503a in FIG. 5B), particularly when inclusive caches are being used, the data are ultimately passed down through and among the lower cache layers and consumed by one or more of the processing units. Rather than logging this data again as it is passed down through the layers and consumed, embodiments instead log CCP transitions for the cached memory location, which can later be used to reconstruct how the data was used. Thus, for example, in environment 503 of FIG. 5A, this may mean logging the CCP transitions between (N-1)-level caches (i.e., caches 502a and 502b) as their corresponding processing units read from and/or wrote to the (N-1)-level cache line corresponding to the cached memory location. In environment 504 of FIG. 5B, on the other hand, this may mean logging the CCP transitions between caches 501a and 501b, since these are the N-1-level caches in this environment. Again, the logging can be initiated by circuitry and/or microcode 102c of processor(s) 102. Alternatively, the logging could be initiated by a tracer 104a, including an operating system kernel 104b and/or hypervisor.

As was discussed in connection with FIG. 3, this CCP logging could include logging one or more points of transition among periods of stores and periods of loads as the cache memory location is accessed by the (N-1)-level caches (i.e., caches 502a and 502b). This could also potentially include logging a value stored in the cached memory location at one or more of these points of transition. This could also include causing one or more CCP transitions based on activity of a single processing unit to be logged (e.g., load/store transitions by a single processing unit).

In environment 503 of FIG. 5A, there are no additional lower-level caches, so method 400 may end. However, environment, 504 includes one more layer. As such, method 400 may also include an act 403 of, during the parallel execution, logging (N-2)-level cache coherence protocol transitions (e.g., among a plurality of (N-2)-level caches).

Act 403 can be performed in environments that also include plurality of (N-2)-level caches, and in which each (N-1)-level cache is associated with two or more of the plurality of (N-2)-level caches, and the (N-1)-level cache is configured as a backing store for the two or more (N-2)-level caches. In some embodiments act 403 can comprise causing one or more (N-2)-level CCP transitions between the two or more (N-2)-level caches to be logged, the (N-2)-level CCP transitions resulting from the particular location being accessed by the two or more of the plurality of processing units. Thus, for example, in environment 504 of FIG. 5B, this may mean logging the CCP transitions between (N-2)-level caches (i.e., caches 502a and 502b) as their corresponding processing units read from and/or wrote to the (N-2)-level cache line corresponding to the cached memory location.

Similar to act 402, this CCP logging could include logging one or more points of transition among periods of stores and periods of loads as the cache memory location is accessed by the (N-2)-level caches (i.e., caches 502a and 502b). This could also potentially include logging a value stored in the cached memory location at one or more of these points of transition.

FIG. 4 indicates that act 403 may be performed any number of times, while decreasing the N-level each time. Thus, method 400 can operate in environments including two or more cache layers (i.e., N≥2), with no upper limit on the number of cache layers that can be used.

Additionally, method 400 can be performed repeatedly (typically in parallel) for each outer N-level cache layer. Thus, for example, in FIG. 5A, method 400 can be performed for cache layer 501a, and also for cache layer 501b. In FIG. 5B, method 400 can be performed for cache layer 503a, and also for cache layer 503b. When method 400 is performed on two or more N-level cache layers, the log data generated based on each outer N-level cache layer could be logged to different data streams in trace files 104d (e.g., one per processing unit), or could be logged into a single data stream while being tagged in a manner that enables data for the different N-level caches to be separated. Ordering between these two sets of data could be at least partially ordered by logging certain events (e.g., accesses to shared memory) in reference to a monotonically incrementing number (MIN) that is used across the data sets, CCP data indicating cache communications between the data sets, etc.

As was described in connection with FIG. 1, processor(s) 102 can include buffer(s) 102d that can be used for temporarily storing trace data. Thus, in method 400, "causing" different types of data to be logged could comprise the processor 102 storing such data into the buffer(s) 102d. Additionally, or alternatively, it could include the processor 102 communicating such data to the tracer 104a, writing such data to the trace file(s) 104d, and/or notifying the tracer 104a that the data is available in the buffer(s) 102d. In some embodiments, the buffer(s) 102d could comprise one or more reserved portions of the cache(s) 102b.

As was also described in connection with FIG. 1, processors 102 may also include control registers, which are used to control different aspects of processor operation. In some embodiments one or more control registers include one or more bits that control whether logging in enabled. This could be at the granularity of a group of processing units (e.g., a socket, a NUMA group, etc.), or even on a per-processing-unit basis. Thus, using such logging control bits, it may be that only a subset (including a zero set) of processing units actually participate in logging at any given time. In this way, the tracer 104a can granularly control which processing units/threads are being traced and when that tracing is active. This can enable the tracer 104a to control which application(s) are being traced, which specific thread(s) in an application are being traced, whether kernel mode code is being traced, etc.

As mentioned previously, some tracing approaches utilize extensions to one or more of the cache(s) 102b—i.e., additional "logging" or "accounting" bits—that enable the processor 102 to identify, for each cache line, one or more processing units 102a that consumed the cache line. Similar techniques can be used in connection with method 400 to reduce the amount of data that needs to be logged while still retaining full-fidelity tracing. For example, use of "logging" or "accounting" bits can prevent cache lines from being re-logged after a processing units transitions to another context (e.g., another thread, kernel mode, etc.) if that other context did not modify the cache line. Additionally, or alternatively, use of "logging" or "accounting" bits can enable a trace entry for one thread to reference data already logged on behalf of another thread. Thus, as used herein, a "full-fidelity" trace is any trace that contains sufficient information to enable a full replay of a traced entity—even though a particular "full-fidelity" trace may actually contain less data that encapsulates the same information than might be recorded using alternate tracing techniques.

Figure 6A:
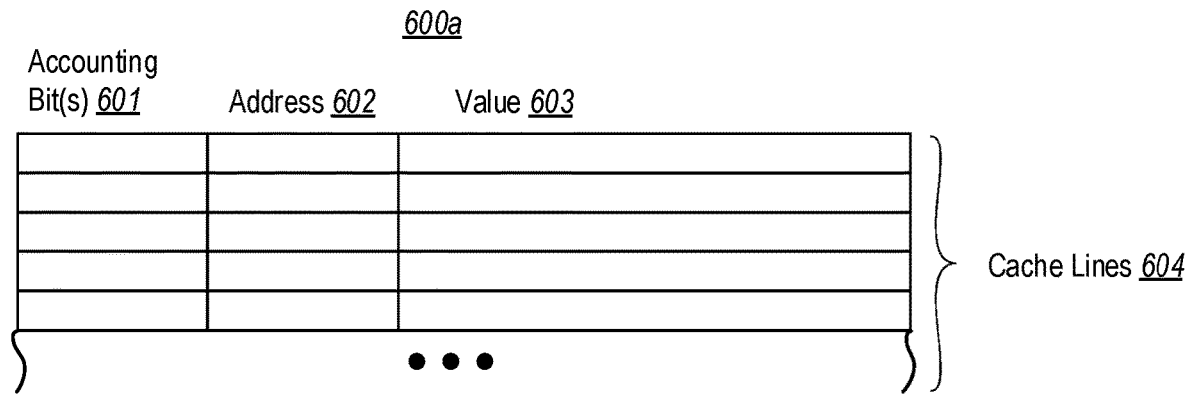
FIG. 6A illustrates an example shared cache that extends each of its cache lines with one or more additional accounting bit(s)
Figure 6B:
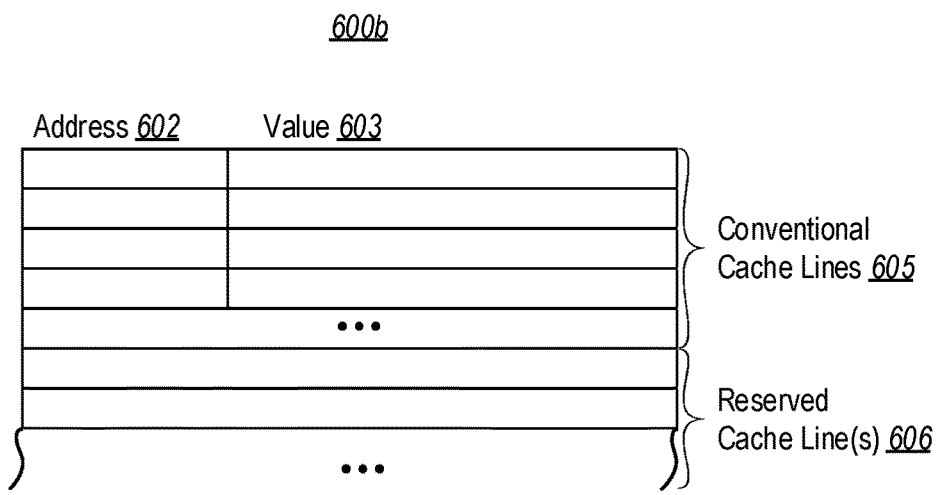
FIG. 6B illustrates an example of a shared cache that includes conventional cache lines that store memory addresses and values, as well as one or more reserved cache line(s) for storing accounting bits that apply to the conventional cache lines.

In order to understand these concepts, FIG. 6A illustrates an example shared cache 600a, similar to the shared cache 203 of FIG. 2B, that extends each of its cache lines 604 with one or more additional accounting bit(s) 601. Thus, each cache line 604 includes accounting bit(s) 601, conventional address bits 602, and value bits 603. Alternatively, FIG. 6B illustrates an example of a shared cache 600b that includes conventional cache lines 605 that store memory addresses 602 and values 603, as well as one or more reserved cache line(s) 606 for storing accounting bits that apply to the conventional cache lines 605. The bits of the reserved cache line(s) 606 are allocated into different groups of accounting bits that each corresponds to a different one of the conventional cache lines 605. In a variation of the example FIG. 6B, the reserved cache line(s) 606 could be reserved as one (or more) ways in each index of a set-associative cache. For example, in an 8-way set-associative cache one way in a set could be reserved for accounting bits that apply to the other seven ways in the set. This can decrease the complexity of implementing reserved cache lines and can speed access to the reserved cache lines since all ways in a given set are typically read in parallel by most processors.

Regardless of how the accounting bits are actually stored, each cache line's accounting bit(s) 601 for the outer (N-level) cache could comprise one or more bits that function as a flag (i.e., on or off) used by the processor(s) 102 to indicate whether or not the present value in the cache line was actually consumed by a processing unit that participates in logging. This is useful because the value need not be logged if the value imported to the N-level was not actually used by a traced processing unit. For example, some implementations only log the present value in the cache line (i.e., at act 401) if the value imported to the N-level was actually used by a traced processing unit. A value may be imported to the N-level cache, but not actually used, because the processor 201 may engage in speculative execution. Processors 201 may engage in speculative execution in an attempt to keep its execution pipelines full, by executing instructions that it predicts may be executed in the future. Execution of these speculative instructions may cause cache misses at the N-level cache. If it turns out that the speculative instruction(s) that caused these cache misses are not retired (e.g., they are discarded due to a different execution path being taken than was predicted/speculated), then some implementations may elect not to log these values. Thus, the processor 102/tracer 104a may log the value of a cache miss only if the one of these bits becomes set for a given cache line. Additionally, or alternatively, these bit(s) can be used to prevent the same value from being logged again if it is re-imported to the N-level cache. For example, a speculative cache miss may cause a logged value to be evicted from the N-level cache. Later, non-speculative instructions may access that value again, causing another cache miss. These bit(s) can be used to track this situation, and thus be used to avoid re-logging the value.

In some embodiments, the lower-layer caches may be configured to "push" consumption data up to higher level caches to assist with logging. For example, when accounting bits are used on an outer N-layer cache, one more of the lower-level caches may communicate to the outer N-layer cache an indication of when a particular value was consumed (potentially with information about the processing unit that consumed it). This provides the outer N-layer cache with the information it can use to set/clear the bits.

Figure 7A:
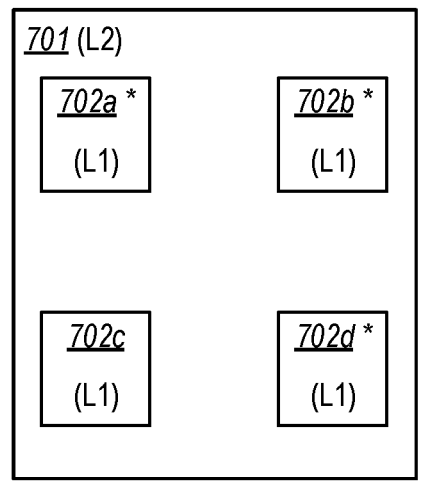
FIG. 7A illustrates an example of trace recording in which only a subset of lower-level caches is logged.

As mentioned, some embodiments may include control registers with one or more logging control bits that control whether processing units participate in logging. As mentioned, while this could be at the per-processing-unit granularity, it may only be at the granularity of a group of processing units. Some implementations may lack logging control bits altogether. Either of these situations can present challenges when recording only a subset of processing units is desired. For example, FIG. 7A illustrates an example 700a of trace recording using method 400, but in which only a subset of lower-level caches is logged. In particular, FIG. 7A shows an outer N-level cache 701 (e.g., an L2 cache) and four inner (N-1)-level caches 702a-702d. As indicated by the asterisks, only processing units associated with (N-1)-level caches 702a, 702b, and 702d are the ones that the tracer 104a is interested in recording. However, if the hardware environment lacks logging control bits, or has logging control bits that operate only at a granularity of the N-level cache 701 generally, then (N-1)-level cache 702c would also be recorded.

This situation can present a couple of problems. First, the resulting trace may include unnecessary trace data relating to code that executed at cache 702c. Second, security concerns may arise when a trust level of the code that executed at cache 702c is different from a trust level of the code that executed using caches 702a, 702b, and 702d. This could be because process(es) associated with the code that executed using cache 702c have a different trust level than process(es) associated with the code that executed using caches 702a, 702b, and 702d (e.g., they could be from different users, and/or the code that executed using caches 702a, 702b, and 702d could operate in user mode while the code that executed using cache 702c could operate in kernel mode). Alternatively, this could be because a kernel that managed the code that executed using cache 702c is different from a kernel that managed the code that executed using caches 702a, 702b, and 702d (e.g., if the these two kernels executed on top of a hypervisor, and the hypervisor assigned the processing unit(s) associated with cache 702c to one kernel, and assigned the processing unit(s) associated with caches 702a, 702b, and 702d to another kernel).

In order to overcome these concerns, some embodiments may apply post-processing of the resulting trace files in order to separate out the trace data streams and produce a trace file that contains only the subset of data streams for which tracing was desired (i.e., to remove data streams for processing units other than those for which recording was desired). In order to maintain security, this would typically be performed in a hardware and software environment that has a trust level that is at least equivalent to the trust level that was used for trace recording. For example, if the trace recording was performed at a kernel level, the post-processing environment would typically have a trust level as least equivalent to that of kernel, or if the trace recording was performed at a hypervisor level, the post-processing environment would typically have a trust level as least equivalent to that of the hypervisor. The post-processing might be performed at the same computer system that performed the recording, or it might be performed at one more other computer system(s) that have the requisite trust level. Additionally, the post-processing could potentially be performed in real-time or near real-time (either by the computer system is performing the recording, or by some other computer system(s)), or could deferred for later. Note that, as used herein, a "trust level" may refer to a user-level trust (as opposed to software-enforced permissions), such as the trust level of a system and/or infrastructure administrator. For example, if the hypervisor is part of the cloud infrastructure, other components of that infrastructure may be at the same level of trust—even if they are in different machines—as long as they ensure the same level of isolation, access restrictions, etc. as the hypervisor.

Figure 7B:
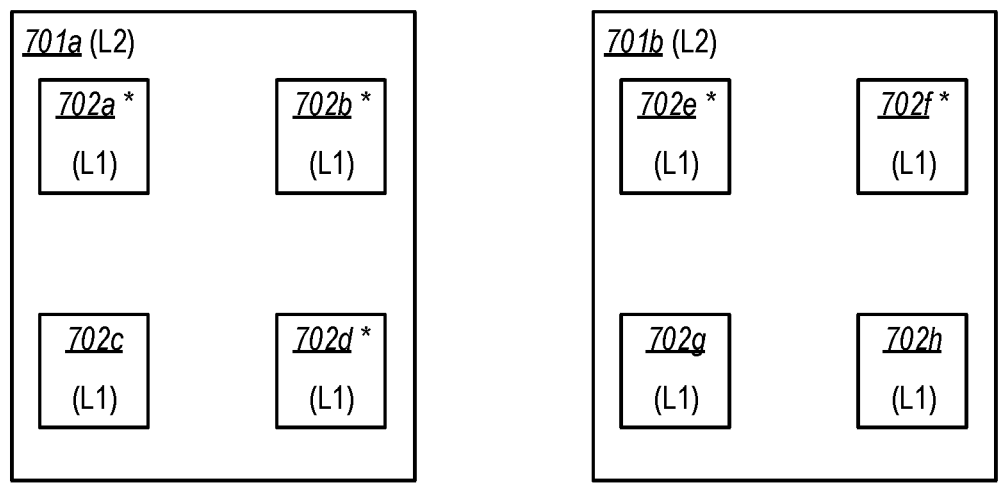
FIG. 7B illustrates an example of trace recording in which only a subset of lower-level caches is logged, in an environment that has at least two outer N-level caches, each associated with a plurality of inner (N-1)-level caches.

As mentioned, method 400 can be performed in parallel for multiple outer N-level cache layers (e.g., different sockets or NUMA groups). As explained, the situations may result in a different data stream for each outer layer. The post-processing described herein is applicable to these situations as well. For example, FIG. 7B illustrates an example 700b that has two outer N-level caches 701a and 701b (e.g., L2 caches), each having four inner (N-1)-level caches 702a-702h (e.g., L1 caches). As indicated by the asterisks, the processing units associated with (N-1)-level caches 702a, 702b, and 702d within N-level cache 701a, and the processing units associated with (N-1)-level caches 702e and 702f within N-level cache 701b are the ones that the tracer 104a is interested in recording. However, it may be that (N-1)-level caches 702c within N-level cache 701a and 702g and 702h N-level cache 701b are also recorded. Here, similar post-processing could be performed at an appropriate trust level on the data recorded for N-level cache 701a, while a separate post-processing could be performed at an appropriate trust level on the data recorded for N-level cache 701b.

These principles are not limited to separating out trace data that was not requested to have been recorded. Rather, they can also be used to separate traces for threads that were all requested to be recorded, but that have different trust levels among themselves. For example, returning to FIG. 7A, it could be that the threads that executed on the processing units associated with caches 702a and 702b have a different trust level than the thread(s) that executed on the processing units associated with cache 702d, even though they all executed on the same kernel. Here, a post-processing at a trust level at least equivalent to the kernel may be used to separate these traces into different trace files.

This can even be extended to other trust levels. For example, suppose further that a kernel executing the threads using caches 702a 702b, and 702d is different from a kernel that executed the thread(s) using cache 702c (both executing on the same hypervisor). Here, a post-processing at a trust level at least equivalent to the hypervisor could separate the trace data for the threads that used caches 702a, 702b, and 702d from the trace data for the thread(s) that used cache 702c. Then, post processing at a trust level that is at least equivalent to either the hypervisor or the kernel that used caches 702a, 702b, and 702d could separate the trace data for the threads that used caches 702a, 702b from the trace data for the thread(s) that used cache 702d.

Accordingly, the embodiments herein create bit-accurate "time travel" trace recordings based on tracing the effects of execution across a plurality of processing units on at least two tiers or layers of processor caches. This could include modifications to processor hardware and/or microcode that assist in recording (i) the influxes (i.e., cache misses) to an outer or "upper-layer" shared processor cache, as well as (ii) cache coherence protocol (CCP) transitions among a plurality of inner or "lower-layer" processor caches that are backed by the outer/upper-layer shared processor cache. These techniques can be extended to "N" levels of caches. Recording trace files in this manner may require only modest processor modifications and, when compared to prior trace recording approaches, they can reduce by several orders of magnitude both the performance impact of trace recording as well as trace file size.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing device, comprising:
a plurality of processing units;
a plurality of (N-1)-level caches;
an N-level cache that is associated with two or more of the plurality of (N-1)-level caches, and that is configured as a backing store for the two or more (N-1)-level caches; and
control logic that includes computer-executable instructions to configure the computing device to record execution of an entity that executes parallel threads across two or more of the plurality of processing units, based on performing at least the following:
based at least on detecting an influx of memory data from a particular memory location in system memory to a particular cache location in the N-level cache that results from execution of a first thread of the entity by a first of the plurality of processing units, cause the influx of memory data to the particular cache location in the N-level cache to be logged into a replayable trace of the entity; and
based at least on having caused the influx of memory data to the particular cache location in the N-level cache to be logged into the replayable trace of the entity, subsequently cause one or more (N-1)-level cache coherence protocol (CCP) transitions between the two or more (N-1)-level caches to be logged into the replayable trace of the entity, the (N-1)-level CCP transitions resulting from the particular cache location being accessed by a second of the plurality of processing units based on execution of a second thread of the entity by the second of the plurality of processing units.

2. The computing device as recited in claim 1, wherein:
the computing device also comprises a plurality of (N-2)-level caches, and in which each (N-1)-level cache is associated with two or more of the plurality of (N-2)-level caches, and the (N-1)-level cache is configured as a backing store for the two or more (N-2)-level caches; and
the stored control logic also configures the computing device to cause one or more (N-2)-level CCP transitions between the two or more (N-2)-level caches to be logged into the replayable trace of the entity, the (N-2)-level CCP transitions resulting from the particular cache location being accessed by the two or more of the plurality of processing units.

3. The computing device as recited in claim 1, wherein the influx of memory data results from one or more cache misses on the N-level cache as a result of execution of the first thread of the entity.

4. The computing device as recited in claim 1, wherein the one or more (N-1)-level CCP transitions comprise one or more points of transition among periods of stores and periods of loads.

5. The computing device as recited in claim 4, wherein causing the one or more (N-1)-level CCP transitions to be logged comprises logging a value stored in the particular cache location at one or more of the points of transition.

6. The computing device as recited in claim 1, wherein:
the computing device also comprises a buffer; and
the control logic also configures the computing device to perform deferred logging into the replayable trace of the entity based on one or more one or more of:
storing the influx of memory data from the particular memory location to the buffer, or
storing the one or more (N-1)-level CCP transitions between the two or more (N-1)-level caches to the buffer.

7. The computing device as recited in claim 1, wherein the computing device also comprises one or more logging control bits that control whether one or more of the plurality of processing units participate in logging.

8. The computing device as recited in claim 1, wherein the control logic comprises one or more of circuitry or stored microcode.

9. The computing device as recited in claim 1, wherein at least the N-level cache includes one or more accounting bits that identify one or more of (i) whether a value at the particular cache location has been logged, or (ii) whether the value at the particular cache location should be logged.

10. The computing device as recited in claim 9, wherein the control logic also configures the computing device to set at least one accounting bit in the N-level cache based on a communication from one or more of the (N-1)-level caches.

11. The computing device as recited in claim 9, wherein the control logic also configures the computing device to use the one or more accounting bits to refrain from logging influxes of memory data resulting from speculative execution of an instruction.

12. The computing device as recited in claim 1, wherein causing the one or more (N-1)-level cache coherence protocol (CCP) transitions between the two or more (N-1)-level caches to be logged into the replayable trace of the entity comprises causing an identity of a point of the each (N-1)-level CCP transition to be logged into the replayable trace of the entity, including identifying the point of each (N-1)-level CCP transition as corresponding to one of (i) a first transition from a load CCP state of the particular cache location to a store CCP state of the particular cache location, or (ii) a second transition from the store CCP state of the particular cache location to the load CCP state of the particular cache location.

13. The computing device as recited in claim 12, wherein the load CCP state comprises at least one of an owned CCP state or a shared CCP state, and wherein the store CCP state comprises at least one of modified CCP state or an exclusive CCP state.

14. The computing device as recited in claim 12, wherein the first transition corresponds to a transition from a first period of one or more loads to a second period of one or more stores, and the second transition corresponds to a transition from a third period of one or more stores to a fourth period of one or more loads.

15. A method for recording execution of an entity that executes parallel threads across two or more of a plurality of processing units based on memory data influxes to an outer-level cache and CCP transitions between inner caches, the method being implemented at a computing device that includes (i) the plurality of processing units, (ii) a plurality of (N-1)-level caches, and (iii) an N-level cache that is associated with two or more of the plurality of (N-1)-level caches and that is configured as a backing store for the two or more (N-1)-level caches, the method comprising:

based at least on detecting an influx of memory data from a particular memory location in system memory to a particular cache location in the N-level cache that results from execution of a first thread of the entity by a first of the plurality of processing units, causing the influx of memory data to the particular cache location in the N-level cache to be logged into a replayable trace of the entity; and based at least on having caused the influx of memory data to the particular cache location in the N-level cache to be logged into the replayable trace of the entity, subsequently causing one or more (N-1)-level cache coherence protocol (CCP) transitions between the two or more (N-1)-level caches to be logged into the replayable trace of the entity, the (N-1)-level CCP transitions resulting from the particular cache location being accessed by a second of the plurality of processing units based on execution of a second thread of the entity by the second of the plurality of processing units.

16. The method of claim 15, wherein the computing device also includes (iv) a plurality of (N-2)-level caches, and in which each (N-1)-level cache is associated with two or more of the plurality of (N-2)-level caches, and the (N-1)-level cache is configured as a backing store for the two or more (N-2)-level caches, the method also comprising:

causing one or more (N-2)-level CCP transitions between the two or more (N-2)-level caches to be logged into the replayable trace of the entity, the (N-2)-level CCP transitions resulting from the particular cache location being accessed by the two or more of the plurality of processing units.

17. The method of claim 15, the method also comprising causing one or more CCP transitions based on activity of a single processing unit to be logged.

18. The method of claim 15, wherein at least the N-level cache includes one or more accounting bits that identify one or more of (i) whether a value at the particular cache location has been logged, or (ii) whether the value at the particular cache location should be logged, and wherein the method further comprises setting at least one accounting bit in the N-level cache based on a communication from one or more of the (N-1)-level caches.

19. The method of claim 15, wherein at least the N-level cache includes one or more accounting bits that identify one or more of (i) whether a value at the particular cache location has been logged, or (ii) whether the value at the particular cache location should be logged, and wherein the method further comprises using the one or more accounting bits to refrain from logging influxes of memory data resulting from speculative execution of an instruction.

20. A computer program product comprising one or more hardware storage devices having stored thereon computer-executable instructions that are executable by a computing device that includes (i) a plurality of processing units, (ii) a plurality of (N-1)-level caches, and (iii) an N-level cache that is associated with two or more of the plurality of (N-1)-level caches and that is configured as a backing store for the two or more (N-1)-level caches, the computer-executable instructions being executable to cause the computing device to perform at least the following as part of recording execution of an entity that executes parallel threads across two or more of the plurality of processing units:

based at least on detecting an influx of memory data from a particular memory location in system memory to a particular cache location in the N-level cache that results from execution of a first thread of the entity by a first of the plurality of processing units, cause the influx of memory data to the particular cache location in the N-level cache to be logged into a replayable trace of the entity; and based at least on having caused the influx of memory data to the particular cache location in the N-level cache to be logged into the replayable trace of the entity, subsequently cause one or more (N-1)-level cache coherence protocol (CCP) transitions between the two or more (N-1)-level caches to be logged into the replayable trace of the entity, the (N-1)-level CCP transitions resulting from the particular cache location being accessed by a second of the plurality of processing units based on execution of a second thread of the entity by the second of the plurality of processing units.

* * * * *